Nov. 16, 1937.  T. N. ST. HILL  2,098,982
ELECTRIC DEHYDRATOR
Filed Sept. 11, 1934   2 Sheets-Sheet 1
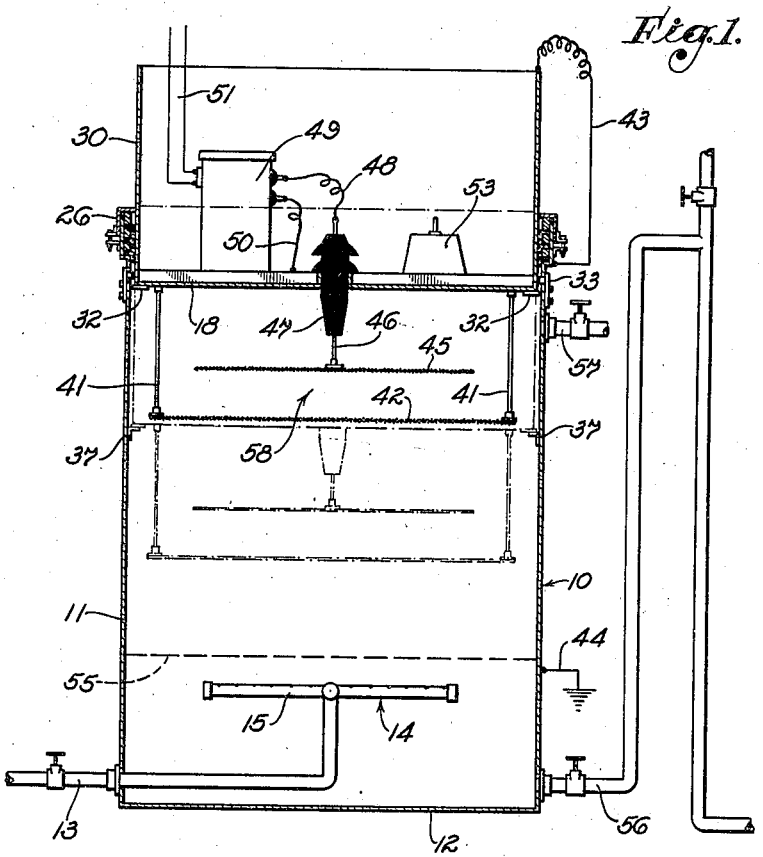
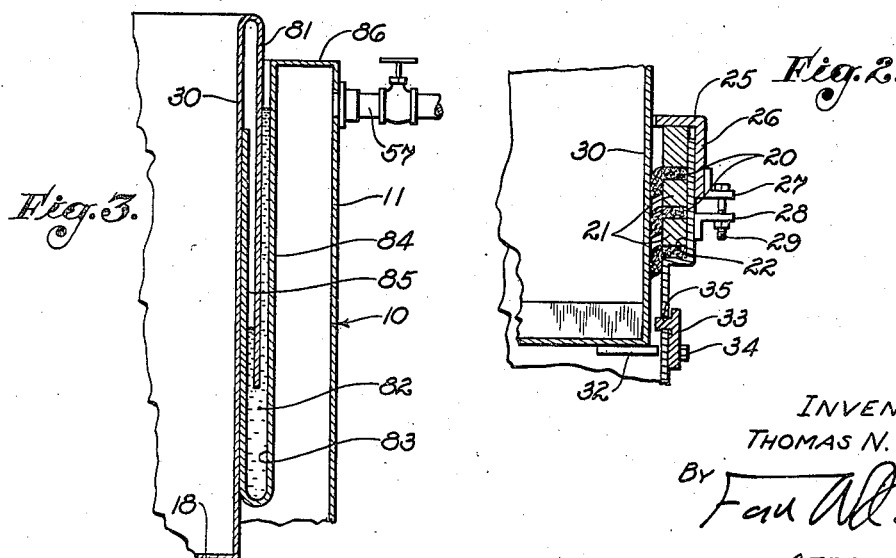
INVENTOR
THOMAS N. ST. HILL
By
ATTORNEY.

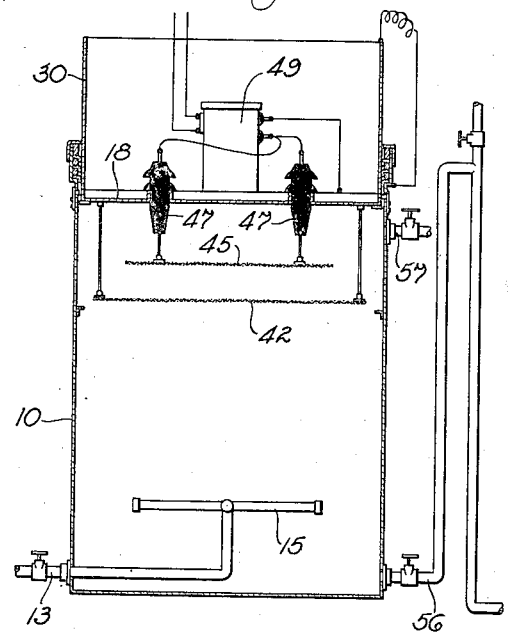
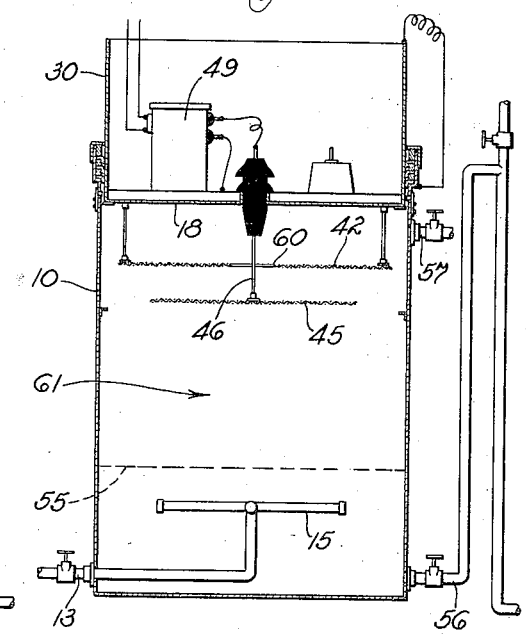
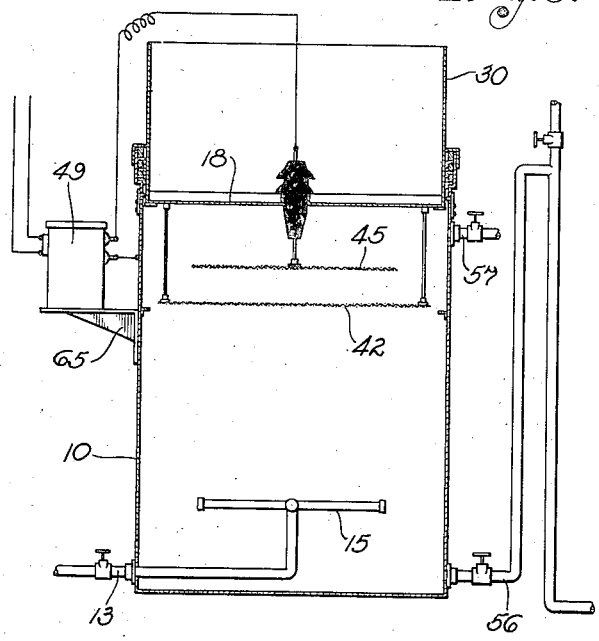

Patented Nov. 16, 1937

2,098,982

UNITED STATES PATENT OFFICE 2,098,982

ELECTRIC DEHYDRATOR

Thomas N. St. Hill, San Marino, Calif., assignor to Petroleum Rectifying Company of California, Los Angeles, Calif., a corporation of California Application September 11, 1934, Serial No. 743,533

14 Claims. (Cl. 204—24)

My invention relates to systems for treating emulsions, and includes novel method and apparatus concepts. More particularly, the invention relates to an electric treater for coalescing the dispersed phase of an emulsion, this treater including constructional features decreasing fire hazards and having new structural and functional relationships.

The invention will be particularly described with reference to a system for dehydrating emulsions of crude oil in which the oil is the continuous phase and water is the dispersed phase. It will be clear, however, that this embodiment is selected only for illustrative purposes, the treater of my invention being useful in other capacities and with various types of emulsions.

In the electric treatment of emulsions by the use of an electric field of sufficient intensity to coalesce the dispersed particles of the emulsion, a serious fire hazard is present if the oil level in the tank is lowered so as to admit air or gas into the upper end thereof. In general, the invention compensates for a drop in level in such a treater tank, and at the same time may be used to change the position or character of the electric field or fields therein.

It is an object of the present invention to provide a novel system for automatically compensating for a drop in level in the tank of an electric dehydrator.

Another object of the invention is to provide a movable wall closing the upper end of a treater tank, and in most instances to allow this wall to contact the surface of the liquid in the tank.

It is a further object of the invention to utilize this type of system for controlling the pressure existing in the tank.

A new relationship of electric fields can be effected if one or more of the electrodes are mounted to move in response to this movement of the upper wall, and it is an object of the present invention to provide a treater in which the position or character of the electric field or fields can be readily changed in response to the amount of liquid in the tank or the position of a movable wall closing one end of the tank.

It is a further object of the invention to provide a treater having other structural features which are new in the art, including a novel arrangement of the electrodes establishing a field or fields in the treater, and a novel relationship between the potential supply means and the treater.

Further objects and advantages of the invention will be made evident to those skilled in the art from the following description.

Referring to the drawings in which several embodiments of the invention are disclosed, Fig. 1 is a vertical sectional view of one embodiment of the invention.

Fig. 2 is an enlarged view of the sealing means shown in Fig. 1.

Fig. 3 is an enlarged view of an alternative sealing means of the liquid-seal type.

Figs. 4, 5, and 6 are vertical sectional views of alternative forms of the invention.

Referring particularly to Fig. 1, the embodiment therein shown includes a tank 10 containing a variable quantity of liquid, usually emulsion constituents in the process of gravitationally separating. This tank includes a side wall 11, usually of cylindrical form, and a lower wall 12, and the incoming emulsion is introduced thereinto through a pipe 13 to which a suitable distributor means 14 is connected. In the embodiment shown, this distributor means is in the form of a cross-shaped spray pipe 15 perforated at its upper end so that the emulsion is discharged upward in a lower section of the tank 10.

The upper end of the tank 10 is closed by a movable wall 18 which is vertically movable in response to the amount of liquid in the tank. Usually this wall contacts the upper surface of the liquid so as to eliminate air pockets.

Suitable means are provided for sealing this movable wall 18 with respect to the tank during its vertical movement. In Figs. 1 and 2 such means are illustrated as comprising a plurality of washers or rings 20 inter-spaced with spacers 21. Such a sealing means may be mounted either on the movable wall 18 or on the tank. In the embodiment shown, the upper end of the side wall 11 is enlarged to form a cavity 22 in which the rings 20 and the associated spacers 21 are positioned. An annular member 25 may be used for retaining the sealing means in proper position. As shown, this annular member includes a depending flange 26 telescoping with the upper end of the enlarged portion of the side wall 11, brackets 27 and 28 being respectively mounted on these members. Clamping means which may take the form of a series of clamping screws 29 extend between the brackets 27 and 28 and serve to clamp the sealing means in the cavity 22. The movable wall 18 may be provided with an upward extending wall 30, usually of cylindrical shape, which is engaged by the sealing rings 20 in fluid-tight relationship. The sealing means utilized should be of such type as to not excessively impede a free vertical movement of the movable wall 18 with respect to the tank 10.

A suitable stop means is preferably provided to limit the vertical movement of the movable wall 18. In this connection a plurality of stops 32 may be secured to the lower end of the movable wall 18, as best shown in Figs. 1 and 2. Upper stop members 33 may be removably secured to the side wall 11 as by cap screws 34 and provide pins 35 extending through corresponding openings of the side wall and into the path of travel of the stops 32, thus limiting the upward movement of the wall 18. Other stop members, such as brackets 37 may be secured to the interior of the side wall 11 in a position to be engageable by the stops 32 when the movable wall 18 is in its desired lowermost position.

Suitable means is provided for establishing one or more electric fields in the tank 10. While these fields may be of conventional character and in a fixed position relative to the tank, I have found that new treating relationships can be established if one or more of the electrodes are so mounted as to move in response to a movement of the wall 18. Thus, in Fig. 1, rods 41 depend from the movable wall 18 and carry a lower interstitial electrode 42, usually formed of metallic screen. This electrode may be grounded through a conductor 43 electrically connecting the movable wall 18 and the tank, this tank being grounded as indicated by the numeral 44.

So also a live electrode 45 may be mounted to move with the wall 18, this electrode being formed of interstitial material in this embodiment of the invention. Mounting means for this electrode may include a rod 46 extending through a bushing 47 and connected to a high-tension lead 48 of a transformer 49. This high-tension lead corresponds to one terminal of the secondary winding of the transformer, the other terminal being grounded through a conductor 50. The usual supply line 51 and electrical accessories are used to energize the primary winding of the transformer 49.

The pressure developed in the tank 10 can be controlled by suitable weight means positioned on the movable wall 18. If desired, the transformer 49 can be mounted thereon so that the weight of the transformer acts to increase the pressure in the tank 10. If a single bushing 47 is used, it is desirable to mount the transformer 49 to one side thereof and to use a counterbalancing weight 53 to counteract the turning moment developed by the positioning of the transformer 49 to one side of the vertical axis of the tank. In other instances, however, it is possible to dispense with such auxiliary weights by mounting the transformer 49 centrally with respect to the wall 18, and utilizing two or more bushings 47 for supporting the live electrode 45. Such a system is shown in Fig. 4.

In operating the treater, it is sometimes desirable to preliminarily fill the tank with dry oil or other liquid of relatively high dielectric strength. The emulsion is introduced through the pipe 13 and after the treater has been in operation for a time, the liquid inside the tank will comprise stratified bodies of the phase liquids, or a mass of the phase liquids undergoing gravitational separation. If petroleum emulsions are being treated, the lower end of the tank 10 will contain a body of water providing a relatively well-defined upper surface, indicated, for instance, by the dotted line 55. Similarly, the upper end of the tank immediately below the movable wall 18 will contain relatively dry oil. The water and oil can be respectively withdrawn continuously or intermittently through pipes 56 and 57 in a well-known manner. Between the bodies of water and oil there will be a mass of emulsion constituents undergoing gravitational separation. The liquid in the tank 10 thus gradually decreases in water content toward the upper end thereof, the material in the lower end of the tank being relatively wet.

The electrodes 42 and 45 define a treating space 58 in which an intense electric field is established. The emulsion entering this field is treated thereby to coalesce the dispersed phase into masses of sufficient size to gravitate from the continuous phase. The dry or relatively dry oil moving toward the movable wall 18 is subjected to an additional field between this wall and the live electrode 45.

The amount of liquid in the tank 10 controls the effective volume thereof and controls the position of the movable wall 18. This quantity of liquid is determined by the relative rates at which the emulsion constituents enter and leave the tank, if the treater is being used to effect a continuous dehydration process. Suitable valves in the pipes 13, 56, and 57 may be used in controlling the rate of flow of the emulsion constituents into and from the tank.

It will also be clear that the vertical position of the treating space 58 will be dependent upon the position of the movable wall 18, and that the electric field can be moved relative to the tank 10 by changing the quantity of liquid in this tank. I have found this relationship to be very desirable, for different emulsions have different treating and separating characteristics. Thus, the water content at a given section of the tank with one type of emulsion may be different from the water content at the same section when a different type of emulsion is being treated. Shifting of the vertical position of the electric field permits adjustment to most effectively treat any particular emulsion.

So also, the position of the field is automatically shifted in response to a change in position of the movable wall 18 and thus indirectly in response to a change in the water content at a given section. Thus, assuming that the movable wall 18 is in its lower position indicated by dotted lines, the dry oil zone will be immediately beneath this wall. If now the volume of liquid in the tank is gradually increased, as by a decrease in the out-flowing constituents or an increase in the incoming constituents, the wall 18 will move upward a proportional distance. If the electrodes remained in their former position, it is clear that the water content at this point would materially increase due to the fact that the effective settling space has been increased in height. However, with the structure shown, the electrodes move upward with the movable wall 18. This action thus tends to maintain the electrodes in a zone of substantially constant water content, regardless of the volume of the liquid in the tank 10. While it is not essential to maintain an exact correlation between the position of the electrodes and the water content in the field, any structure which permits approaching such conditions is very desirable, and my system in which the electric field is shifted in response to a movement of the wall 18 is very effective in this regard, and permits vertical movement of the field as the quantity of conducting liquid at a given section increases or decreases due to change in volume of the enclosed space.

Certain additional advantages can often be maintained if a structure such as shown in Fig. 5 is utilized. Here the grounded and live electrodes are reversed in position, the grounded electrode 42 providing an opening 60 through which the rod 46 extends, the live electrode 45 being positioned below the electrode 42. In such a system the incoming emulsion may be first washed by the body of water in the lower end of the tank, if the distributor is positioned below the level 55. Thereafter the rising emulsion constituents are subjected to the action of an auxiliary electric field in an auxiliary treating space 61 between the live electrode 45 and the surface 55 of the body of water. If the movable wall 18 is in a relatively low position, this field will be relatively intense, but as the wall 18 moves upward the intensity of the auxiliary field will decrease, assuming that the level 55 remains substantially constant. Even if the movable wall 18 is moved upward due to only an increase in the incoming constituents, the intensity of the auxiliary field will decrease, for the level 55 will rise in response to the increased amount of water entering the tank, but the movable wall 18 will rise much faster because it moves in response to the total quantity of the emulsion constituents in the increased flow. It will thus be clear that the gradient in the auxiliary field can be changed in response to the position of the wall 18 or the amount of liquid in the tank.

In all of the forms of the invention previously described, the pressure in the tank is controlled, and usually maintained substantially constant, by the weight of or on the movable wall 18. This is often a very desirable factor, for many emulsions treat better above atmospheric pressures. In addition, the movable wall 18 permits the pressure to be maintained substantially constant, a factor which is often desirable. If a pulsating flow of emulsion is delivered to the pipe 13, the wall 18 may move to compensate for this pulsating or intermittent flow, maintaining the pressure in the tank substantially constant. Further, this system is very desirable in that it maintains the pressure in the treater even though the volume of the liquid in the tank decreases, an action impossible of attainment when using commercial treaters at present available.

In some instances, however, it may be desirable to treat at pressures not materially greater than atmospheric. In such event, the transformer 49 may be removed from the movable wall 18 and mounted on a suitable bracket 65 secured to the tank, or may be otherwise mounted in a switchhouse or on a pole supporting the supply line. Such a construction is shown in Fig. 6.

It will be clear that various types of sealing means may be used without departing from the spirit of the invention. It is, of course, very desirable to prevent entrance of air into the upper end of the treater, as well as to prevent escape of emulsion constituents from the tank around the wall 18. While the sealing means shown in Fig. 1 is usually entirely satisfactory, it is also possible to use a liquid-type seal such as shown in Fig. 3. Here, the upward extending wall 30 provides a depending sleeve 81 which dips into a body of liquid 82 retained in an annular channel 83 of the tank 10. This channel may be formed by concentric walls 84 and 85 depending from an annular plate 86 secured to the side wall 11 of the tank. Water or mercury or any other suitable liquid can be used to complete the sealing action. If desired, the upward extending wall 30 may slidably engage the wall 85 to guide the wall 18 in its vertical movement.

It will thus be clear that I have devised a new method and apparatus for treating emulsions in which a decrease in the amount of liquid in the tank will not result in a fire hazard. The treater can be continuously or intermittently operated, and the volume of the liquid in the tank can be readily changed. So also, my invention comprehends the provision of one or more electric fields which can be changed in position or character in response to change in treating conditions. My invention also comprehends a system in which the fields are moved to compensate for change in water content tending to take place at a given section.

My invention also finds utility when used as a batch treating method. The unit may be completely filled with wet oil (emulsion) and the water phase drawn off as fast as formed without having to add fresh wet oil (emulsion) to the unit to replace the water and keep the unit full as is the case with conventional treaters.

Various changes may be made without departing from the spirit of the invention as defined in the accompanying claims.

I claim as my invention:

1. In combination in an electric treater: a tank containing a liquid; a vertically movable wall at the upper end of said tank; an electrode suspended from said wall to move vertically with said movable wall; and means for setting up an electric field adjacent said electrode whereby said electrode changes in vertical position with a vertical movement of said movable wall.

2. A combination as defined in claim 1 including stop means limiting the vertical movement of said movable wall and thus determining the maximum upper and lower positions of said electrode.

3. A combination as defined in claim 1 in which said tank provides a body of conducting liquid in the lower end thereof and in which said electrode is live whereby an electric field is formed between said electrode and the surface of said body of conducting liquid, said field thus changing in average gradient when said movable wall is vertically moved.

4. A combination as defined in claim 1 in which said tank provides a body of conducting liquid in the lower end thereof and in which said electrode is live whereby an electric field is formed between said electrode and the surface of said body of conducting liquid, said field thus changing in average gradient when said movable wall is vertically moved, and including stop means associated with said movable wall for preventing said live electrode from coming too close to the surface of said body of conducting liquid.

5. In combination in an electric treater for emulsions: a tank containing treated emulsion constituents undergoing separation, one end of said tank containing a body of the liquid forming the continuous phase of the emulsion to be treated, the proportion of the conducting liquid forming the dispersed phase of said emulsion progressively increasing toward the other end of said tank whereby the proportion of said conducting liquid varies throughout the height of said tank; electrode means for establishing an electric field in said tank; means for changing the quantity of said conducting liquid in said liquid of said continuous phase at a given section of said tank; and means associated with said last-named means for moving said electrode means to vertically move said electric field as the amount of said conducting liquid at said section changes.

6. In combination in an electric treater: a tank containing the liquid to be treated; electrode means for establishing an electric field in said tank; means for changing the quantity of liquid in said tank; and means responsive to the quantity of liquid in said tank for moving said electrode means to move said electric field.

7. A method of treating an emulsion in a tank, which method includes the steps of: establishing an electric field in said tank and of sufficient intensity to treat the emulsion therein; changing the quantity of liquid in said tank; and moving said electric field in response to the changing amount of liquid in said tank.

8. A method of electrically treating an emulsion, which method includes the steps of: confining in a closed variable-volume space a given quantity of emulsion completely filling said space; establishing an electric field in said space of sufficient intensity to coalesce the dispersed phase of said emulsion into masses which gravitate to one end of said space to form a body of the dispersed-phase liquid; and removing the dispersed-phase liquid from said body during continued treatment by said electric field to decrease the volume of said space.

9. In combination in an electric treater: stationary and movable walls defining a variable-volume space; electrode means in said space; and means operatively connecting said electrode means to said movable wall whereby the movement of said movable wall which takes place when the volume of said chamber is changed acts to change the position of said electrode means.

10. In combination in an electric treater for emulsions containing a conducting phase liquid and a phase liquid of higher dielectric strength: a tank containing a body of said conducting phase liquid in one end thereof; a live electrode in said tank; means for changing the quantity of said conducting phase liquid in said body; and means for changing the position of said live electrode in said tank as the quantity of said conducting phase liquid in said body thereof is changed.

11. In combination in an electric treater: a tank containing a liquid; a movable wall closing the upper end of said tank and vertically movable in response to the amount of liquid in said tank, said movable wall contacting the upper surface of said liquid in said tank to eliminate gas pockets in the upper end of said tank; and means for establishing an electric field in said tank to treat said liquid therein, said means including a grounded electrode carried by said movable wall, a live electrode carried by said movable wall, and an insulating bushing carried by said movable wall to insulate said live electrode therefrom and from said grounded electrode.

12. In combination in an electric treater: a tank containing a liquid; a movable wall closing the upper end of said tank and vertically movable in response to the amount of liquid in said tank, said movable wall contacting the upper surface of said liquid in said tank to eliminate gas pockets in the upper end of said tank; a vertically extending annular wall positioned adjacent said tank and carried by said movable wall; a sealing means for sealing said annular wall with respect to said tank in fluid-tight relationship, said sealing means exerting an insufficient force to prevent vertical movement of said movable wall when the amount of said liquid in said tank is changed and being in surface contact with the liquid in said tank to eliminate gas pockets thereadjacent; and means for establishing an electric field in said tank to treat said liquid therein.

13. In combination in an electric treater: a tank containing a liquid; a movable wall closing the upper end of said tank and vertically movable in response to the amount of liquid in said tank, said movable wall contacting the upper surface of said liquid in said tank to eliminate gas pockets in the upper end of said tank; a vertically extending annular wall positioned adjacent said tank and carried by said movable wall; sealing means for sealing the space between said annular wall and said tank; draw-off means communicating with said space when said movable member is in a lower position to remove liquid from the upper end of said tank; and means for establishing an electric field in said tank to treat said liquid therein.

14. In combination in an electric dehydrator for coalescing and separating a dispersed phase of a water-in-oil type of emulsion: a tank containing a body of liquid comprising separated and separating constituents of said emulsion; a pair of electrodes in said tank and insulated from each other; means for delivering the emulsion to be treated to said tank; means for maintaining a constant superatmospheric pressure in said tank regardless of variation in flow of said incoming emulsion and regardless of variation in the volume of said body of liquid in said tank, said means including a wall extending across the upper end of said tank and movably mounted to contact the upper surface of said body of liquid, the pressure exerted by said wall controlling and maintaining substantially constant the pressure on the emulsion undergoing treatment; means for energizing said electrodes to establish an electric field therebetween of sufficient intensity to coalesce the dispersed phase of said emulsion, said means including a transformer positioned on said movable wall to raise and lower therewith, and including an insulator extending through said movable wall, and including a conductor means extending through said insulator and electrically connecting said transformer to one of said electrodes; and means for separately withdrawing the constituent phase liquids of said emulsion from the upper and lower ends of said tank.

THOMAS N. ST. HILL.